United States Patent [19]

Strabala

[11] 4,093,180

[45] June 6, 1978

[54] GEARED HAND WHEEL FOR BUTTERFLY VALVES

[75] Inventor: Joseph Lawrence Strabala, Orinda, Calif.

[73] Assignee: James M. Carroll Company, Orinda, Calif.

[21] Appl. No.: 717,055

[22] Filed: Aug. 23, 1976

Related U.S. Application Data

[63] Continuation of Ser. No. 513,093, Oct. 8, 1974, abandoned.

[51] Int. Cl. ............................................. F16k 31/53
[52] U.S. Cl. .................................. 251/248; 251/249.5; 251/286; 251/288; 74/437; 74/802
[58] Field of Search ........................ 74/437, 801, 802; 251/58, 248, 249, 249.5, 284, 286

[56] References Cited

U.S. PATENT DOCUMENTS

| | | | |
|---|---|---|---|
| 1,499,763 | 7/1924 | Davis | 74/801 |
| 1,788,602 | 1/1931 | Sutton et al. | 74/802 |
| 1,818,555 | 8/1931 | Helland | 74/802 |
| 1,851,147 | 3/1932 | Banker | 74/802 |
| 2,025,244 | 12/1935 | Morehead et al. | 251/248 |
| 2,231,784 | 2/1941 | Von Thungen | 74/802 |
| 2,312,376 | 3/1943 | Andrew | 74/802 |
| 2,402,043 | 6/1946 | Hays | 74/801 |
| 2,438,061 | 3/1948 | Lear | 74/802 |
| 2,722,851 | 11/1955 | Steiner | 74/802 |
| 2,932,992 | 4/1960 | Larsh | 74/801 |
| 3,081,648 | 3/1963 | Duer | 74/437 |
| 3,143,899 | 8/1964 | York | 74/802 |
| 3,401,580 | 9/1968 | Sigg | 74/801 |
| 3,448,828 | 6/1969 | Goldberg | 74/802 |
| 3,756,095 | 9/1973 | McCoy, Jr. et al. | 74/801 |

Primary Examiner—Alan Cohan
Assistant Examiner—G. L. Walton
Attorney, Agent, or Firm—Joseph L. Strabala

[57] ABSTRACT

The ability to control butterfly valves is greatly enhanced with a geared hand wheel having concentrically contained therein a pair of flat spur gears with at least one tooth difference and a pinion gear meshing with both of these gears with the pinion carried by the hand wheel in a planetary manner about these gears whereby a mechanical advantage is achieved as the spur gears are caused to rotate relative to one another by rotation of the hand wheel to control the valve shaft of the butterfly valve.

8 Claims, 8 Drawing Figures

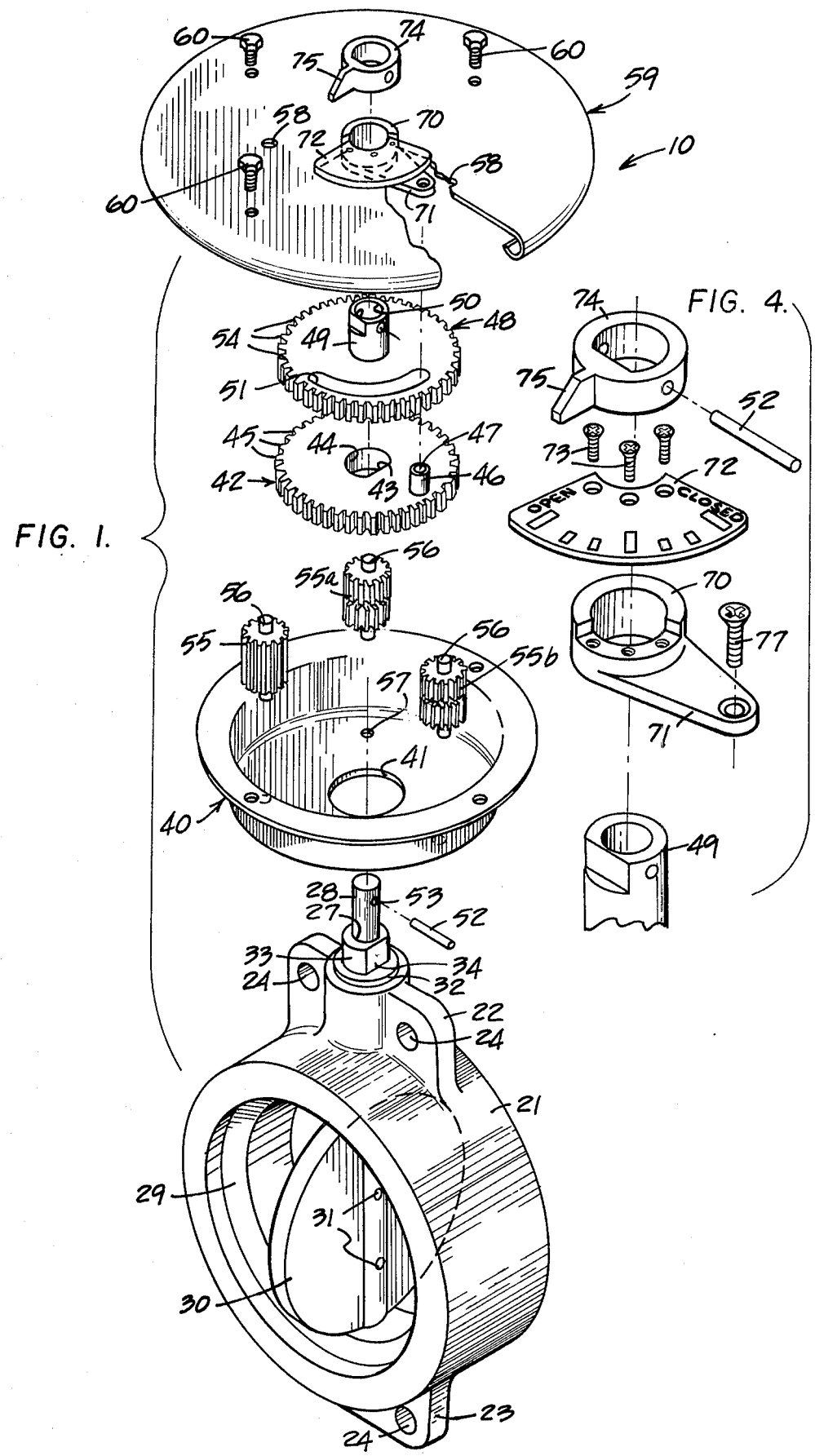

GEARED HAND WHEEL FOR BUTTERFLY VALVES

This is a continuation, of Ser. No. 513,093, filed Oct. 8, 1974 now abandoned.

BACKGROUND OF THE INVENTION

Butterfly valves such as disclosed in U.S. Pat. No. 2,994,342 issued to Stillwagon, especially in pipe systems requiring a large internal diameter, are replacing the more conventional gate valve, primarily because they are more economical from a cost standpoint. Economies are realized both from a reduction of the material necessary to construct the butterfly valve and its lower shipping weight. Further, in some models, elastomer seats on opposite sides of the valve form an integral gasket enabling such a butterfly valve to be inserted between a pair of aligned pipe flanges which are thereafter pulled together with the flange bolts to form a leak-free joint between the valve and abutting ends of the pipe flanges.

Because the butterfly valve is essentially a cylindrical matching portion of the pipe system with a rotatable circular valve disc mounted therein so it can be oriented transverse to the flow axis to close off the flow through the valve and parallel therewith to allow full flow, it is highly compact, as part of the room for the disc swing is provided by the pipe line. In addition, only one quarter turn of the valve shaft supporting the valve disc is required to open or close the conventional butterfly valve, allowing rapid adjustment to different flow conditions.

With all of the indicated advantages, a properly constructed conventional butterfly valve, having a good elastomer seat for the disc and suitable seals for its valve shaft, does have some drawbacks. First, the torque necessary to rotate the valve shaft controlling the valve disc varies markedly with service conditions, and can, as an example, on a 12 inch butterfly valve, vary from a few foot pounds to over 310 foot pounds when operating a flow system containing it at 150 psi, as the disc is opened and/or closed. Further, the rate of change of torque is so rapid that an operator can easily lose control of the valve shaft, allowing the disc to "snap shut" or "open rapidly". In liquid systems having relatively high flow rates, loss of control of the valve disc can result in serious damage to the pipe system, including a rupture of the pipe system due to hydraulic surge following the rapid closing or opening of the butterfly valve. Therefore, the initial economy of the butterfly valve is often offset by the potential damage to the pipe system resulting from improper valve control. Thus, the safer gate valve is often used in its place to avoid such problems, since equipping the butterfly valve with a worm gear drive results in a cost approaching the cost of a gate valve.

Another disadvantage of the conventional butterfly valve occurs because of imprecise throttling control. Since the valve shaft turns only 90° from full open to full close, precise control of the disc in all of its possible intermediate positions is required to match the control afforded by other types of valves, such as the gate valve. Conventional lever control of the valve shaft of a butterfly valve with limited "setting notches" therefore leaves a great deal to be desired in many fluid control systems.

Most of the advantages of conventional butterfly valves can be maintained if worm gear control of the valve shaft is employed. However, the prior art worm gear systems, with the drive shaft being oriented perpendicularly to the valve shaft, are too expensive and cumbersome, making the butterfly valve so equipped generally uncompetitive with the gate valve.

Thus the instant invention has as its object improved gear control of the valve shaft of a butterfly valve which is inexpensive and yet provides precise control of the valve disc without the appendant dangers of loss of control.

SUMMARY OF THE INVENTION

The above disadvantages are overcome in a butterfly valve which has a cylindrical valve housing, a disc mounted therein on a valve shaft therein for rotation from an "open" to a "closed" orientation by employing a gear handle assembly including two concentric gears mounted adjacent to one another and concentric with the valve shaft, one of said gears having at least one tooth fewer than the other, with one of the gears fixedly connected to the valve body and the other gear fixedly connected to the valve shaft, with a carrier assembly arranged to rotate concentrically with said gears, and at least one pinion gear meshing with both of said concentric gears and mounted in the carrier assembly whereby rotation of the carrier assembly will cause said gears in turn slowly relative to one another as the carrier assembly rotates. Stops are provided to limit the rotational travel of the concentric gears relative to one another, and can serve as a visual indicator reflecting the orientation of the disc in relationship to the flow axis of the piping system, as well as determining the "open" and "closed" positions thereof.

DESCRIPTION OF THE DRAWINGS

FIG. 1 is an exploded view of the geared hand wheel illustrating its components and their association with a butterfly valve;

FIG. 4 is an exploded view of the indicator for the hand wheel illustrated in FIGS. 1 to 3;

DESCRIPTION OF SEVERAL EMBODIMENTS OF THE INVENTION

Figure 3:
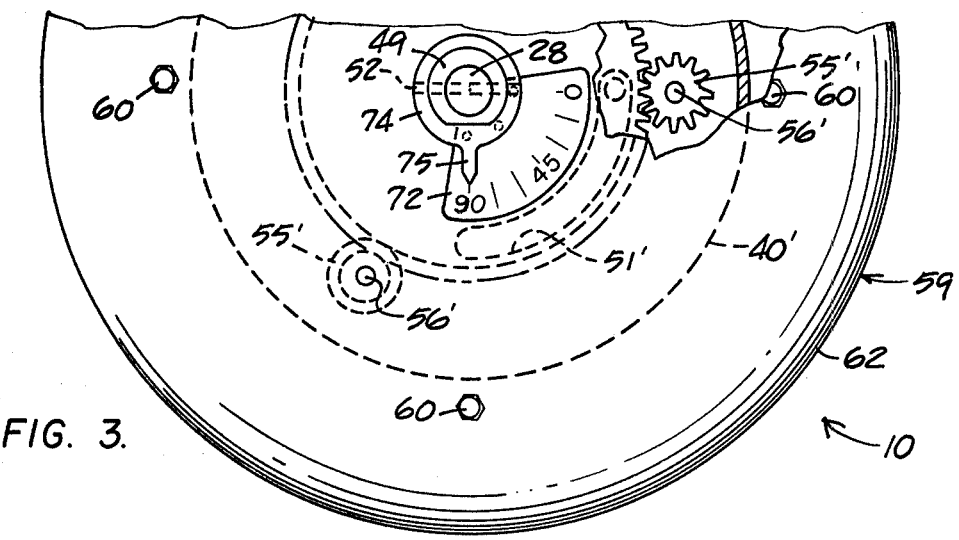
FIG. 3 is a broken-away plan view of the geared hand wheel illustrating an indicator and internal parts with phantom lines.
Figure 2:
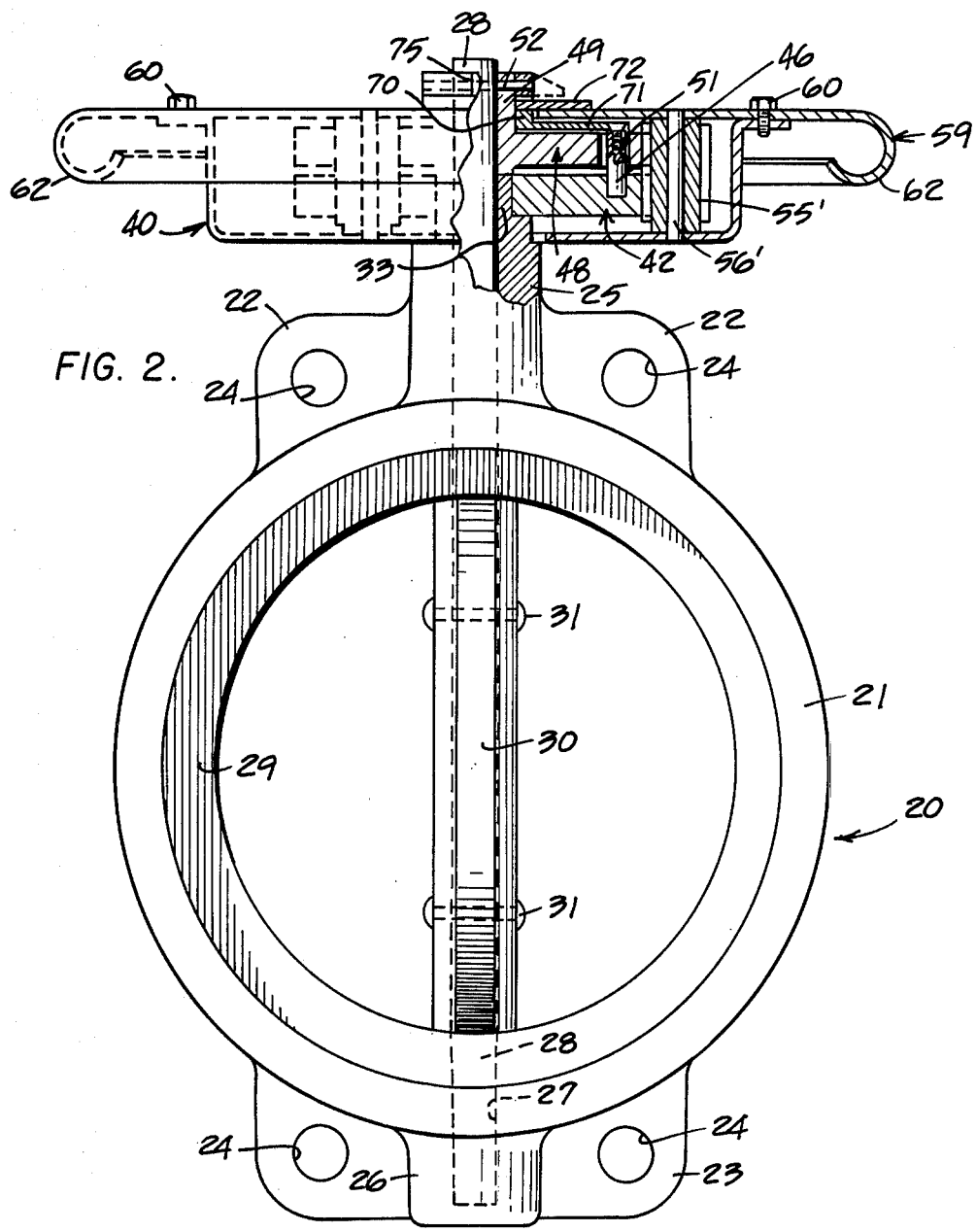
FIG. 2 is an elevation of the geared hand wheel assembled with a butterfly valve with parts broken away to show additional detail.

Referring to FIGS. 1, 2 and 3, a geared handle 10 is illustrated with conventional butterfly valve 20. In the butterfly valve, a cylindrical hollow valve housing 21 forms the principal component thereof, and in the valve illustrated, an integral central projecting top flange 22 with a similar bottom flange 23 include bolt holes 24 that serve to locate the valve housing between adjacent pipe flanges when it is connected in a pipeline.

Centrally located in each of the flanges 22 and 23 is an enlarged journal portion 25 and 26 respectively in these respective flanges. Each of these journal portions includes a radial bore 27 in the central portion of the housing that is aligned on a common axis so that a valve shaft 28 can be inserted diametrically through the hollow valve housing 21. If desired, the radial bores 27 can be equipped with sleeved bearings (not shown) as well as grooved to receive O-rings (not shown) so that when the valve shaft is inserted, it is properly journalled in bearings and also sealed against axial fluid flow along the shaft by the O-rings. The use of such bearings and O-rings is quite conventional in butterfly valves; however, because of the elimination of lateral loadings on the valve shaft through the utilization of the instant invention, such sleeved bearings may not be required, or if required, can be substantially reduced in size.

Before the valve shaft is assembled diametrically in the housing 21, a valve seat 29 is installed in the hollow opening thereof. Various types of valve seats are known, and for the purposes of description herein, applicant incorporates the description of the valve seat illustrated in U.S. Pat. No. 2,994,342 issued to Scillwagon. These types of cylindrical valve seats are generally formed of high quality elastomers and are apertured so that a valve shaft can pass diametrically therethrough when such apertures are in registry with the radial bores 27 in the valve housing 21. With the valve seat in place, a valve disc 30 is installed so that its diametric bore is also in registry with bores 27 and the apertures in the valve seat. Thereafter, the valve shaft 28 is inserted so that it passes respectively through the top bore 27, the top aperture in the valve seat 29, the diametric bore in the valve disc 30, the bottom aperture in the valve seat and then into the bottom bore 27 in the journal portion 26. The shaft is so assembled so that a portion of the valve shaft projects above the top journal portion 25 as shown in the drawings.

In the configuration of a butterfly valve described above, the valve disc, which usually includes rounded peripheral edges so that it will not damage the valve seat when it is closed, essentially floats in the valve seat, which is slightly undersized in relation to the diameter of the valve disc, so that when the latter is oriented transversely (closed) with respect to the cylindrical axis of the valve housing, a 360° seal about the peripheral surfaces of the valve disc is effected with the valve seat. In order to control the valve disc with the valve shaft, the two are usually pinned together with stainless steel pins 31 so that rotation of the valve shaft will rotate the disc. As the valve disc essentially floats within the elastomer seat, it is very undesirable to place axial loads on the valve shaft, since such loading can lead to sufficient distortion of the valve seat that leakage can result.

With respect to the instant invention, it is designed to control the valve shaft, and thus the valve disc, in a manner that axial loadings thereon are substantially eliminated. Further, the particular invention is desirable since it provides a more familiar and conventional approach to the control of butterfly valves through gearing arrangements that resemble a handwheel, which were not available with prior art worm gear drives wherein the hand wheel was located at a right angle to the valve shaft requiring cumbersome installations and access difficulties in some environments.

As can be seen in FIGS. 1 through 3, the instant geared handle drive mounts co-axially on the valve shaft similar to the hand wheel on a gate valve. To provide convenience and to make the geared handle readily adapted to a butterfly valve, the butterfly valve shown in FIG. 1 has the top journal portion 25 thereof machined to provide several cylindrical surfaces of reduced diameter, a larger cylindrical surface 32 and a smaller cylindrical surface 33, the latter of which includes a flat 34. While it is not necessary to modify a butterfly valve in the above manner, as the geared handle can be adapted to a conventional bolt circle found in many conventional butterfly valves, the modification is illustrated to illustrate how quickly the gear handle can be removed and assembled with the valve.

More particularly, in reference to geared handle 10 shown in FIGS. 1, 2 and 3, it can be seen that its basic outer component is a cup-shaped housing or carrier 40 that includes a central aperture 41 that is received on the larger cylindrical surface 32 of the journalled portion 25 of the butterfly valve so that it can freely rotate thereon. With the housing mounted in this manner, a flat anchor spur gear 42 can be mounted on the smaller cylindrical diameter 33 so that a flat 43 in its aperture 44 registers with flat 34 as the spur gear is inserted into the cup-shaped housing. Obviously, the mating of these two flats will essentially anchor the spur gear against rotation even though housing 40 is free to rotate therebeneath. The utilization of the flats is but one means of anchoring the the anchor gear to the valve housing 21. This anchor gear has a plurality of gear teeth 45 cut in its outer peripheral surface and also has a stop pin 46 mounted perpendicularly in its top surface; this pin includes a small threaded bore 47 in its projecting end, as can be seen in FIG. 1. The functions of the stop pin and the bore will be described subsequently.

After the anchor gear has been assembled in the above manner, a flat spur drive gear 48 with a hub 49 projecting from its top surface is assembled by sliding it on valve shaft 28 so that this shaft is received in its bore 50. An arcuate slot 51 is milled in the drive so that the slot will receive the stop pin 46 of the anchor gear 42 as the drive gear is assembled on the valve shaft. The length of this arcuate slot is arranged so that the stop pin will limit the rotational travel of the drive gear relative to the anchor gear to 90° of relative rotation. The hub 49 of the drive gear 48 has a transverse bore intersecting its bore 50 through which a steel pin 52 can be inserted so that it will lock the hub to the valve shaft when the pin is located in bore 53, which is provided in the valve shaft for this purpose. When the pin is inserted, the several gears are concentrically mounted within the housing 40 and are in close proximity, if not in a contiguous relationship. At this juncture, it should be appreciated that with the proper orientation of the arcuate slot 51 relative to the attachment of the hub 49 to the valve shaft with pin 52 and the relationship of the stop pin 46 in the slot, the rotation of the valve shaft will be limited to 90°, allowing the valve disc to be adjusted from a full open position to a full closed position at the two stop limits formed by the arcuate slot.

Relative rotation between the anchor gear 42 and the drive gear 48, the latter of which has teeth 54 similar to the teeth 45 on the anchor gear, can be accomplished by the utilization of one or more pinion gears 55, 55a, 55b, since the drive gear and the anchor gear have at least a tooth difference in their outer periphery. More specifically, drive pinion 55 is arranged so that it simultaneously meshes with both the teeth of the anchor gear 42 and the teeth of the drive gear 48, being journalled in the housing or carrier 40 for free rotation. As a result, planetary movement of pinion gear 55 about these two concentric gears will cause relative movement between the two gears due to the differential in the number of teeth.

For example, if the anchor gear 42 has 59 teeth and the drive gear has 60 teeth, a gearing reduction ratio of 60 to 1 will be achieved. More precisely, the drive gear will make 1/60th of a revolution for every revolution of the pinion gear. The formula for the reduction ratio is:

$$\text{Reduction ratio} = 1 - \frac{\text{teeth anchor gear}}{\text{teeth pinion}} \times \frac{\text{teeth pinion}}{\text{teeth drive}}$$

With only one tooth difference between the drive and anchor gears, conventional spur gears can be employed, since their pitch diameters are sufficiently close that a suitable mesh will be obtained with a standard pinion gear. In a preferred embodiment, it is desirable to modify the pitch diameters of both the anchor gear and the drive gear slightly to achieve a better mesh with the pinion gear for longer trouble-free service life of the gear drive system.

With respect to the drive pinions 55, 55a and 55b, and assuming that there is only one tooth difference between the anchor gear 42 and the drive gear 48, there is only one place that the teeth of the several gears are in registry about their circumferences. At that location, a drive pinion 55 with elongated teeth can be employed, as the elongated teeth can mesh at this location simultaneously with both the teeth of the several gears. At all other locations about the periphery of the anchor and drive gears, the teeth thereof are not in registry. Therefore, drive pinions 55a and 55b are really composed of two drive pinions of equal width which are sandwiched together with the teeth off-set and joined so that rotation therebetween cannot occur. This will allow the several portions of the drive pinions to register with the teeth of the respective anchor and drive gears at preselected locations. This can be accomplished by press-fitting two pinion gears off-set by the necessary degree with respect to the teeth on a common shaft 56. As shown in the drawings, a single pinion 55 also uses a similar shaft 56.

The shaft 56 of the respective drive pinions is received in apertures 57 in the housing or carrier 40 and in similar apertures 58 in a cover plate 59, which closes the top of the housing so that each pinion is journaled top and bottom in meshing engagement with the drive and anchor gear when the cover plate is attached to the housing or carrier with bolts 60, best shown in FIG. 2.

It can be seen that cover plate 59 is larger than housing 40 so that it extends beyond the periphery of the housing where its outer peripheral edge is rolled under to form a cylindrical hand wheel 62 for operating the gear mechanism. With the hub 49 of the drive gear 48 projecting through an aperture at the top of the cover plate 59, and the unit assembled on a butterfly valve as described above, the hand wheel 62 can be manually grasped and rotated to open or close the valve. Using the 60:1 reduction, the rotation of the hand wheel 15 turns will open or close the valve disc. Since the butterfly valve has no internal stops, the stop pin in the arcuate groove forms satisfactory stops even in light of the relatively high reduction ratio employed in the system.

In respect to the mechanism described above, it is important to recognize that when the hand wheel is released, the valve disc is "locked" in place, as the torque between the drive and anchor gear would have to be sufficient to shear the teeth of the pinion gears engaging the several gears before relative rotation between these two gears could occur. Thus, it is not possible for a person operating the valve through this unique gear drive to lose control of the valve disc, which could ultimately result in damage to the piping system. Further, it is possible to set the valve disc at an indefinite number of settings between its opened and closed positions by merely releasing the hand wheel when the desired disc position has been achieved.

In the embodiment of the geared hand wheel drive illustrated in FIGS. 1, 2 and 3, the housing or carrier 40, together with the cover plate 59, completely encloses the gears in a flat, compact, disc-shaped package that protects the gearing from dirt and other foreign materials. Also, this enclosure is suitable to hold lubricants for the gears, which can be selected to be compatible with the environments wherein the gear would be utilized, and obviously, if desired, additional seals could be incorporated to further seal the gears from water and the like. However, the construction is rugged and using proper materials, it is not necessary to eliminate water from inside the gear housing.

However, since the gears are enclosed as indicated above, it is desirable to provide some type of indicator to show or indicate the position of the valve disc to persons utilizing the valve. Such an indicator (shown in an exploded view in FIG. 4) can be incorporated in the above structure by using a collar structure 70 which has an integral arm 71 enabling the collar to be attached to the stop pin 46 with the bolt 72 which is received in the threaded bore 47 of the stop pin. The collar is slightly oversized with respect to hub 49 on the drive gear 48 and is placed over the hub prior to the time the cover plate 59 is assembled. The cover plate has an enlarged aperture so that a portion of the collar will project through the cover plate when it is assembled on the housing 40. To this collar structure, a sector indicator plate 72 is attached with bolts 43, which is equipped with indicia indicating the disc angle. Since the hub 49 rotates inside the collar structure 70, a separate collar 74 having a pointer 75 can be assembled on the projecting end of the hub on a flat 76 provided for this purpose. This collar can then be locked on the hub with the set screw shown in FIG. 4, and also serves another purpose, which is to retain pin 52 which locks the hub 49 to the valve shaft. Utilizing this arrangement and a removable pin, the geared hand wheel can be removed quickly as a unit by merely removing a single pin and lifting it from the valve. In reference to the indicator, since the collar structure 70 and the sector indicator plate are stationary, being connected to the stop pin, the pointer will track across the plate as the valve shaft and disc turn, indicating the latter's disposition within the valve housing.

Figure 5:
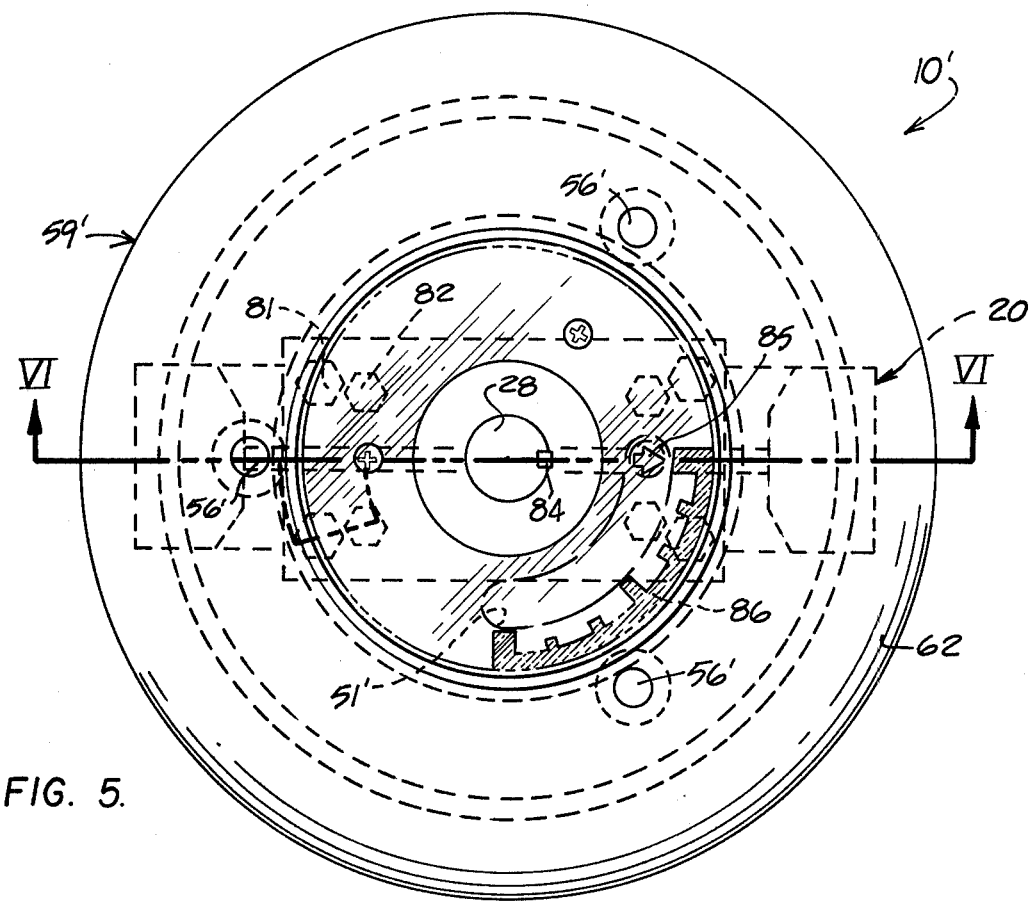
FIG. 5 illustrates an alternate embodiment of the geared hand wheel in a plan view which employs a different indicator arrangement and also employs an adaptor plate making it compatible with conventional butterfly valves.
Figure 6:
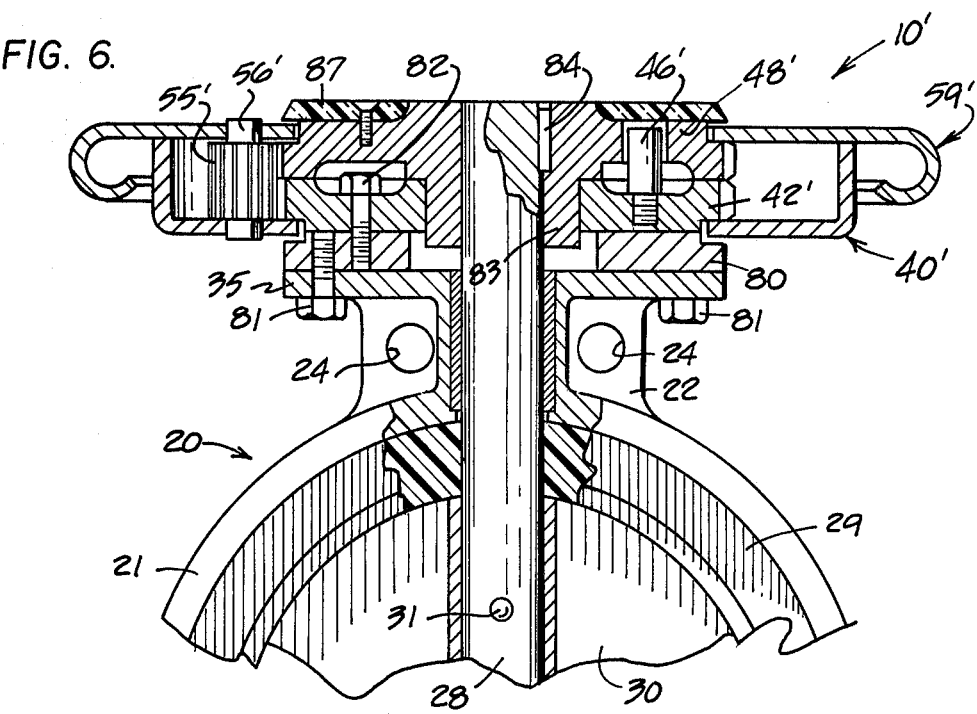
FIG. 6 is a section along line VI—VI of FIG. 5 illustrating the hand wheel associated with the top portion of a butterfly valve.

In FIGS. 5 and 6, an alternate embodiment of the geared hand wheel is illustrated, which has been adapted to be compatible with an unmodified butterfly valve 20' by employing an adapter plate 80 that connects to a valve's conventional bolt circle plate 35 with bolts 81. The adapter plate can be changed to accommodate different styles or sizes of butterfly valves. In this embodiment, the upper peripheral surface of the drive gear 48' and the lower peripheral surface of the anchor gear 42' are relieved so that the cover plate 59' having a large central aperture does not cover the whole top surface of the drive gear and is received in the relieved portion of the gear, as shown in the drawing. Similarly, the housing or carrier 40' does not cover the whole bottom surface of the anchor gear, and likewise has a large aperture which is received in a closely fitted relationship in the relieved portion of the anchor gear. Even though the drive and anchor gear are not fully enclosed, the housing and cover plate do cover the pinion gears and the teeth of these two gears when the housing has been assembled therewith as shown in FIGS. 5 and 6.

As can be seen, the anchor gear 42' is bolted directly to the adapter plate 80 with bolts 82, and the anchor gear includes a stop pin 46' which functions with arcuate slot 51' in the drive gear 48' in the same manner as described above. In addition, in this embodiment, the drive gear has a hub 83 that is received in a fitted aperture in the anchor gear so that any lateral loading between the several gears will not be transmitted to the valve shaft. However, such lateral loadings will not occur where three or more equally spaced pinion gears are used. As a result, it is not necessary to use as large a bearing on large size valves to support the valve shaft, as would be required with worm gear or large lever drives. A key 84 is utilized to connect the drive gear to the valve shaft, and relative rotation of these two concentric gears will change the position of the valve disc as described above.

Since the cover plate in this embodiment does not cover the whole topsurface of the drive gear 48', the position of the stop pin 46' in the arcuate groove can be observed. In view thereof, an indicator arrow 85 can be placed on the top of the stop pin and an arcuate indicator strip 86 placed alongside the arcuate slot 51', and affixed to the drive gear 48', as indicated in FIG. 5. As a result, the indicator arrow will move relative to the indicator strip as the drive and anchor gears rotate relative to one another within the limits allowed by the stop pin and a suitable indicator is thus formed.

To prevent foreign materials from entering the arcuate slot 51', a clear plastic cover cap 87 is mounted on the top face of the drive gear 48' so that it overlaps the cover plate 59' slightly for improved seal therewith. As a result, when the cap is in place, the movement of the indicator pin with its indicator can be observed through the clear plastic cap to provide a visual indication of the relative position of the valve disc.

Figure 7:
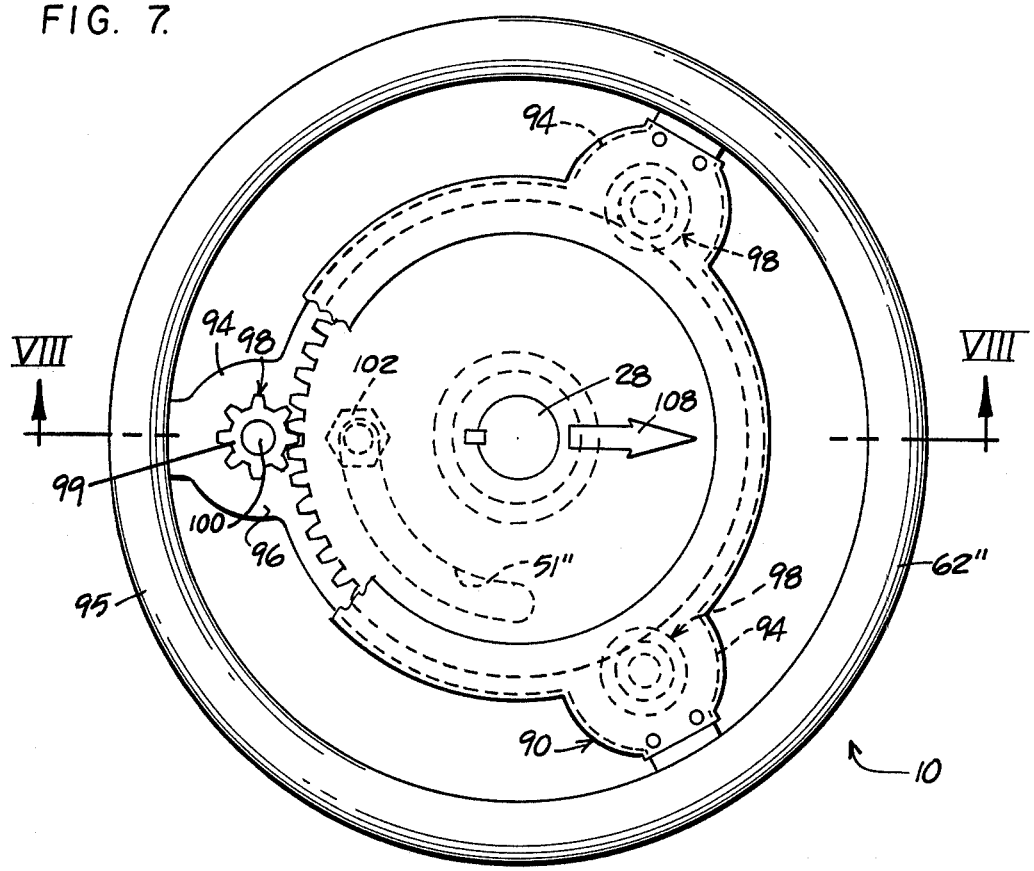
FIG. 7 is a plan view of another embodiment of the geared hand wheel having an extremely compact design.
Figure 8:
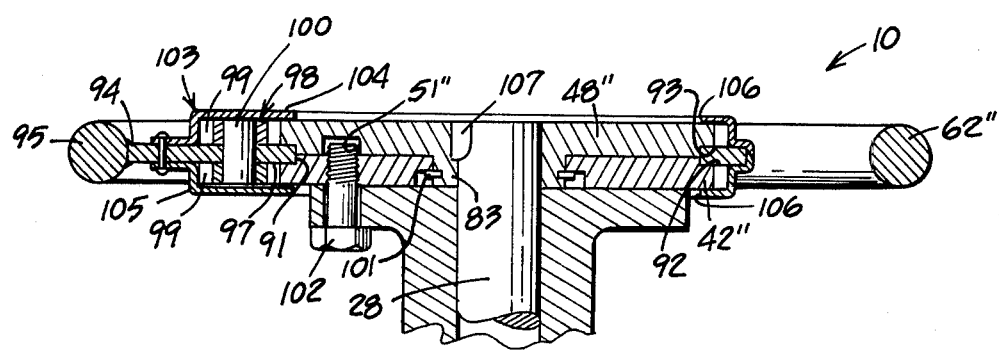
FIG. 8 is a section along line VIII—VIII of FIG. 7 showing the hand wheel attached to the top portion of a butterfly valve.

FIGS. 7 and 8 illustrate a highly compact geared handle 10 wherein a flat carrier plate 90 with a large central aperture 91 is received in a top peripheral relieved groove 92 in the anchor gear 42" and a bottom matching relieved groove 93 in the drive gear 48" so that the carrier is sandwiched between these two gears and can rotate freely thereon as a result of the large bearing surface formed by the matching grooves. Three spokes 94 extend outwardly and connect to a hand wheel 95 which can be formed separately from the carrier and welded to the ends of spokes as illustrated. The top and bottom surfaces 96 and 97 respectively of the wider inner portions of each spoke form a bearing surface for the three pinion gears 98 which are journalled in apertures formed in the carrier plate. Each pinion is composed of two separate gears 99 which can be press-fitted on opposite ends of a shaft 100 after the latter has been placed through its aperture in the carrier plate. Any offset necessary for the proper mesh with the anchor and drive gear for the several separate gear parts of each pinion can be obtained when they are pressed on to the shaft.

Like the embodiments shown in FIGS. 5 and 6, the drive gear 48" has a hub 83' that is received through an aperture in the anchor gear 42", and a snap ring 101 is employed to retain the two parts in an assembled relationship with the carrier. As this unit is adapted to fit the conventional bolt plate 35 of the butterfly valve, one of the attaching bolts 102 can pass through the anchor gear so that its unthreaded end is received in an arcuate slot 51" of the drive gear. This slot is not milled completely through the drive gear, thus closing the slot to the ingress of dirt and the like.

A lightweight casing 103 having upper and lower parts 104 and 105 respectively, each having a large central aperture 106, encloses the gear teeth of all the gears when it is attached with small rivets.

The drive gear 48" is keyed to the valve shaft 28 with a key 107 and a large arrow 108 painted on the top exposed surface of the drive gear in alignment with the valve disc 30. Thus, the relative position of the arrow with respect to the pipeline axis gives a rough position indication of the valve disc to the operator of the valve.

We claim:

1. For a butterfly valve having a projecting valve shaft for turning its control disc to open and closed positions, a disc-shaped geared handle comprising:
   a first circular gear means having attaching means for connecting it to a valve shaft of a butterfly valve;
   a second circular gear means having anchor means for securing it to a butterfly valve in a non-rotating relationship therewith, said first and second circular gear means arranged concentrically and in adjacent relationship with said second circular means having at least one tooth difference with respect to said first circular gear means;
   a carrier means arranged to rotate concentrically with said first and second gear means;
   at least one pinion gear means journalled in said carrier means to mesh with both said first and second circular gear means;
   circular hand wheel means associated with said carrier means whereby manual rotation of said hand wheel is operable to rotate said carrier means so that said pinion gear means meshing with said first and second circular gear means will track therewith in a planetary manner and cause them to rotate slowly relative to one another, in a direction related to the direction of rotation of the carrier and
   stop means arranged between the first and second circular gear means so that it is operable to limit the relative rotation thereof to a predetermined amount.

2. The disc-shaped geared handle defined in claim 1 wherein a plurality of pinion gear means are journalled on the carrier means so that said plurality of pinion gear means mesh with said first and second circular gear means whereby each pinion gear means carries part of the loads involved.

3. The disc-shaped geared handle defined in claim 1 wherein the first and second circular gear means are flat disc-shaped gears arranged in a contiguous relationship.

4. The disc-shaped geared handle defined in claim 1 wherein indicator means are arranged between the first and second circular gear means operable to visually display the relative position of said gear means relative to one another.

5. The disc-shaped geared handle defined in claim 4 wherein part of the indicator means forms the stop means between the first and second circular gear means.

6. The disc-shaped geared handle defined in claim 1 wherein the stop means limits the relative rotation of the first and second gear means to 90°.

7. A butterfly valve with a geared handle comprising:
a cylindrical hollow housing having a valve seat disposed threin;
a circular control disc operably disposed in said seat;
a valve shaft projecting from said hollow housing and fixedly attached to said control disc whereby rotation of said valve shaft is operable to turn said control disc for opening and closing said valve;
a first circular gear means connected to said valve shaft in a non-rotating relationship;
a second circular gear means co-axially mounted with said first gear means anchored to said hollow housing in a non-rotating relationship, said first and second gear means having at least one tooth difference;
a carrier means journalled for co-axial rotation with said valve shaft and said first and second gear means;
at least one pinion gear means journalled in said carrier means in meshing engagement with said first and second gear means;
circular hand wheel means connected with said carrier so that the latter can be rotated thereby, whereby manual rotation of said hand wheel means is operable to cause said pinion means meshing with said first and second gear means to track in a planetary manner and cause said first and second gear means to rotate slowly with reference to one another and
stop means located between the first and second gear means operable to stop relative rotation thereof after a predetermined amount of relative rotation.

8. The butterfly valve defined in claim 7 wherein a plurality of pinion gears means are employed, each being journalled on the carrier to mesh with the first and second circular gear means and operable to carry part of the torque loading between said gears.

* * * * *